3,423,323
PROCESS FOR CLEANING OLEFIN
SEPARATION EQUIPMENT
Edward Allen Hunter, Lake Jackson, Tex., Warren Alfred Knarr, Baton Rouge, and Gerald Albert Byars, Denham Springs, La., and David George Skamenca, Westfield, N.J., assignors to Esso Research and Engineering Company, a corporation of Delaware
No Drawing. Filed Nov. 16, 1964, Ser. No. 411,641
U.S. Cl. 252—153                                 8 Claims
Int. Cl. C11d 7/32

ABSTRACT OF THE DISCLOSURE

Olefin separation equipment is cleaned by dissolving difficult to remove sorbent residues of cuprous halide salts and cuprous halide-ligand complexes in a solvent comprising an alkylolamine and either or both of a lower alkanol and a ketone.

---

This invention is directed to a process for cleaning olefin separation equipment containing difficult to remove olefin sorbent residues of cuprous halide salts and cuprous halide-ligand complexes and mixtures thereof by contacting said residues with an essentially noncorrosive mixture of a lower alkanolamine and a material selected from the group consisting of: (a) a lower alkanol, (b) a $C_3$ to $C_6$ ketone, and (c) mixtures of (a) and (b).

In the field of selectively removing (separating) olefins and polyolefins, e.g., diolefins, etc., from hydrocarbon streams containing them in varying amounts, there have been several commercial procedures developed which involve the use of cuprous halide sorbents to achieve the selective olefin separation. Essentially, these selective sorption processes involve repeated sorption-desorption cycles where the desired olefin is removed from the hydrocarbon mixture containing it by sorption, and then recovering by heating the cuprous halide-olefin complexed sorbent to win the olefin from the sorbent. These olefin separation processes are particularly adapted to the use of fluidized solids techniques since large amounts of heat are required to be transferred in the process. The sorption procedure is highly exothermic whereas the desorption procedure is highly endothermic. Consequently, it is necessary to employ within the fluid solids reactors heat exchangers having a very large surface area to efficiently conduct the sorption-desorption cycles at the proper temperatures for efficient process operations. Consequently it is preferred in conducting selective olefin separation procedures employing cuprous halide sorbents to use a large number of small diameter heat exchangers, e.g., in the form of tubes having diameters of 0.5 to 1.5 inches.

After repeated usage over many sorption-desorption cycles, the cuprous halide sorbent significantly loses its activity and porosity, and is degraded due to attrition, etc., and must be replaced by new cuprous halide sorbent particles. Moreover, the spent cuprous halide sorbent particles, cuprous halide-complex particles and mixtures thereof accumulate on and around the heat exchange tubes which are necessary to insure proper temperature control during the sorption-desorption cycles. Accordingly, it is necessary to clean out the accumulated deposits from time to time. Due to the small diameter of the heat exchange tubes, it is almost impossible to clean the olefin separation equipment using conventional cleaning methods, without completely disassembling the equipment. Consequently, there has been a real need for a solvent which will completely dissolve the cuprous halide salt and cuprous halide-complex residues without requiring the time consuming disassembly and conventional brushing methods of cleaning.

Concentrated aqueous acid and electrolyte solutions, e.g., HCl, $NH_4Cl$ plus HCl, etc., can be used to dissolve these residues, but such solvents are extremely corrosive on the metal surfaces of the olefin separation equipment. The use of such acid solutions requires the use of more expensive metals, e.g., stainless steel vs. the considerably less expensive high carbon steels, in the olefin separation equipment and heat exchange tubes. On the other hand, the much less corrosive hydrocarbon solvents, such as olefins, alkanes, etc., display little or no solvent action upon the cuprous halide and cuprous halide-complex residues sought to be removed during the clean-up operation, under conditions readily obtained in the equipment during clean-up.

The present invention offers a very effective solution to these problems because it enables the less expensive high carbon-containing steels to be employed in the olefin separation equipment and heat exchange tubes, is essentially noncorrosive to these less expensive materials over extended periods of time, and enables essentially complete removal of the objectionable sorbent residues without disassembly of the reactors. Moreover the present invention has another process advantage in that it enables rapid colorimetric evaluation (visual check) to indicate when complete removal has taken place because the cuprous halide salts and cuprous halide-complexes give a deep blue color in the presence of the lower alkanolamines whose use is contemplated herein as a component of the solvent mixture. Other objectives and advantages of the present invention will be apparent from the description which follows:

As mentioned above, the solvent employed in accordance with this invention comprises a noncorrosive mixture of a lower alkanolamine and a material selected from the group consisting of: (a) a lower alkanol, (b) a $C_3$ to $C_6$ ketone, and (c) mixtures of (a) and (b).

The lower alkanolamine can be a $C_2$ to $C_6$ mono or polyalkanolamine, viz, a $C_2$ to $C_6$ mono-, di-, or trialkanol amine wherein any alkanol group(s) can contain from two to six carbon atoms. The following $C_2$ to $C_6$ lower alkanolamines can be listed as exemplary of those which can be used in accordance with this invention: monoethanolamine, mono-propanolamine, monoiso-propanolamine, diethanolamine, di-n-propanolamine, diiso-propanolamine, triethanolamine, monopentanolamine, etc. According to this invention, it is preferable to employ a lower monoalkanolamine containing from 2 to 4 carbon atoms, and the use of mono ethanol amine is especially preferred due to the fact that this alkanolamine has a particularly high solution power for the materials under consideration.

In addition to the above noted lower alkanol amines, there is included in the solvent either a $C_1$ to $C_5$ alkyl alcohol (alkanol), or a $C_3$ to $C_6$ ketone, or a combination of a $C_1$ to $C_5$ alkanol with a $C_3$ to $C_6$ ketone. While any $C_1$ to $C_5$ alkanol can be used, it is preferable to employ a $C_1$ to $C_3$ alkanol because of their solvent compatibility and advantageous dissolving power, especially when combined with the preferred alkanolamine, monoethanolamine. Moreover, these alkanols are readily available at comparatively low cost. Suitable exemplary $C_1$ to $C_5$ alkanols which can be used in accordance with this invention include methanol, ethanol, n-propanol, isopropanol, n-butanol, iso-butanol, tert-butanol, n-amyl alcohol, iso-amyl alcohol, etc. The preferred alkanol is methanol due to high solubility power shown by this alkanol in combination with a lower alkanolamine.

The ketone can be any $C_3$ to $C_6$ ketone. Suitable exemplary $C_3$ to $C_6$ ketones whose use is contemplated in accordance with this invention include the following: dimethyl ketone (acetone), methyl ethyl ketone, diethyl ketone, methyl isopropyl ketone, methyl isobutyl ketone, etc.

The weight ratio of alkanolamine to alkyl alcohol and/or ketone can be varied considerably. Usually, however, it is desirable to employ a solvent mixture containing in its essential components from about 20 to about 85 wt. percent alkanolamine and a corresponding about 15 to about 80 wt. percent of alkanol and/or ketone. Preferably, the solvent mixture contains from 50 to 75% by weight of the $C_2$ to $C_6$ alkanolamine and 25 to 50 wt. percent of the $C_1$ to $C_5$ alkyl alcohol and/or $C_3$ to $C_6$ dialkyl ketone.

The cleanup operation can be conducted conveniently at ambient pressures by contacting the above described solvent mixture with the residues sought to be removed by passing the solvent mixture through the olefin separation equipment at a temperature ranging from 50 to 200° F., usually at temperatures ranging from 60 to 190° F., and preferably at temperatures ranging from about 70 to 170° F. As mentioned previously, the cuprous halide salt and cuprous halide complex residues give a blue color in the presence of lower alkanol amines, especially monoethanolamine, and it is easy to ascertain when complete residue removal has been achieved due to the fact that the solvent mixture flowing through the olefin separation equipment changes from blue to colorless. The actual course and progress of the cleaning process can be followed by monitoring the intensity of the blue coloration by spectrophotometric or colorimetric mechanisms.

The present invention can be employed to clean olefin separation equipment containing residues of cuprous halide salts, e.g., cuprous chloride, cuprous bromide and cuprous iodide, and cuprous halide-complex residues of cuprous halide salts complexed with olefins and polyolefins, viz., cuprous halide complexes containing ligands (carbon containing functional groups capable of forming stable complexes with cuprous halide salts). Thus, e.g., the present invention can be employed where the ligand (complex forming moiety) is butadiene, acetylene, substituted acetylenes, ethylene, propylene, isobutylene, piperylene, etc.

The time required to conduct the cleanup operation will depend upon the amount of cuprous halide salt and/or cuprous halide-complex residues present in and sought to be removed from the olefin separation equipment. Usually, however, a complete cleanup can be satisfactorily conducted in time periods ranging from 1 to 30 minutes per pound of cuprous residue present in the olefin separation equipment. However, these times can vary extremely depending on unit size, weight of deposit, weight of solvent, character of deposit, and extent of contacting.

This invention will be illustrated in greater detail by the examples which follow.

EXAMPLE 1

A complete olefin separation equipment cleanup was conducted on an olefin separation apparatus employing cuprous chloride sorbent and used to remove butadiene from hydrocarbon streams containing it in varying amounts. The reactors of this olefin separation unit are 2-feet in diameter and 50-feet high and are filled with 1-inch diameter heat exchanger tubes spaced on 2-inch centers. The cuprous chloride and cuprous chloride-butadiene sorbent residues remained in the unit even after hammering on the sides of the reactors and washing repeatedly with hexane.

The olefin separation equipment was completely cleaned in accordance with this invention using a solvent mixture containing commercial monoethanolamine (containing some water), methyl alcohol and acetone. The solvent mixture was prepared by mixing one thousand gallons of 85% monoethanolamine (commercial monoethanolamine containing approximately 15% by weight water) with 900 gallons of methanol and 100 gallons of acetone. This mixture was added to the reactors. Agitation within the reactors was achieved by pumping the liquid around combined with bubbling nitrogen through the reactors. The average temperature during contact of the solvent mixture with the residues was 125° F. and ranged from 80 to 130° F.

A colorimetric examination of the effluent solution revealed that solution of the cuprous chloride and cuprous chloride-butadiene complex was complete in 48 hours, but agitation was continued for 60 hours. Analysis of the discharged liquor revealed that 410 pounds of cuprous residue were removed from the reactors. The monoethanolamine-methanol-acetone solvent mixture was removed from the reactors by washing with methanol. Washing was continued until the methanol was colorless. There was no evidence of any corrosion resulting from the use of this solvent.

EXAMPLE 2

Comparative cleanup operations were conducted in the laboratory using ethanolamine containing solvent mixtures as noted below in Table I. The cleanup operations were conducted at the average temperatures noted below in the table, and the resulting efficiency of the solvent mixtures in dissolving the cuprous residues in a 2-hour period are tabulated herein below.

Table I

| Mixture, wt. percent | | | Temp., ° F. | Percent of sample dissolved in 2 hr. |
|---|---|---|---|---|
| Ethanol Amine | $H_2O$ | Other | | |
| 85 | 15 | | 75 | 35.4 |
| 42.5 | 7.5 | 50% MeOH | 75 | 65.0 |
| 21.25 | 3.75 | 75% MeOH | 75 | 42.6 |
| 42.5 | 7.5 | 50% acetone | 165 | 100 |
| 42.5 | 7.5 | 45% MeOH+5% acetone | 75 | 55.8 |

EXAMPLE 3

The instant invention has also been employed successfully to clean out a cuprous halide sorbent preparation unit. In this unit about 120 lbs. of CuCl powder was dissolved in about 400 gallons isobutylene at about 0° F. and the solution pumped through a filter to an agitated precipitate vessel where butadiene is vaporized into the solution to precipitate the complex at about 0° F.

On one occasion, shortly after precipitation of the complex was started, a unit upset took out the refrigeration equipment so that the solution temperature rose appreciably above 0° C. As a result the cuprous chloride precipitated out, mixed with the butadiene complex, in hard, flat platelets resembling buttons, about ½ to 1½ inches in diameter. These proved to be extremely insoluble in isobutylene; and when temperature control was re-established at 0° F., the platelets were too large to pass out through the drain line of the vessel. Washing with hexene also failed to effect substantial removal of the solids from the vessel.

A mixture of 25 percent of 85 percent aqueous monoethanolamine with 75 percent methanol was pumped into the vessel and agitated for three hours at ambient temperature. This vessel was then drained, rinsed with methanol, and blown dry. Inspection found no visible amounts of cuprous chloride in the vessel. The unit was put back in service without further difficulty.

What is claimed is:

1. A process for cleaning olefin separation equipment containing difficult to remove olefin sorbent residues of cuprous halide salts and cuprous halide-ligand complexes and mixtures thereof which comprises contacting said residues at about 50–200° F. with a mixture consisting essentially of, based on 100% of composition, (1) about 20 to about 85 wt. percent of a lower alkanol amine and (2) from about 15 to about 80 wt. percent of a material selected from the group consisting of:

(a) a lower alkanol.

(b) a $C_3$ to $C_6$ ketone, and
(c) mixtures of (a) and (b), with said residues.

2. A process as in claim 1 wherein said lower alkanol amine is a $C_2$ to $C_6$ alkanol amine.

3. A process as in claim 1 wherein said lower alkanol is a $C_1$ to $C_5$ alkanol.

4. A process as in claim 1 wherein said $C_3$ to $C_6$ ketone is a dialkyl ketone.

5. A process as in claim 2 wherein said $C_2$ to $C_6$ alkanol amine is a $C_2$ to $C_4$ monoalkanolamine.

6. A process as in claim 3 wherein said $C_1$ to $C_5$ alkanol is methanol.

7. A process as in claim 4 wherein said $C_3$ to $C_6$ dialkyl ketone is dimethyl ketone.

8. A process as in claim 1 wherein said mixture also includes water.

References Cited
UNITED STATES PATENTS

| | | | |
|---|---|---|---|
| 2,228,752 | 1/1941 | Carter | 260—438.1 |
| 2,467,845 | 4/1949 | Morrell | 260—438.1 |
| 3,255,222 | 6/1966 | Horowitz | 260—438.1 |

LEON D. ROSDOL, *Primary Examiner.*

B. BETTIS, *Assistant Examiner.*

U.S. Cl. X.R.

252—152, 162, 364